United States Patent
Wu et al.

(10) Patent No.: US 9,916,857 B2
(45) Date of Patent: Mar. 13, 2018

(54) TECHNIQUES TO EXTRACT ENF SIGNALS FROM VIDEO IMAGE SEQUENCES EXPLOITING THE ROLLING SHUTTER MECHANISM; AND A NEW VIDEO SYNCHRONIZATION APPROACH BY MATCHING THE ENF SIGNALS EXTRACTED FROM SOUNDTRACKS AND IMAGE SEQUENCES

(71) Applicant: University of Maryland, College Park, College Park, MD (US)

(72) Inventors: Min Wu, Clarksville, MD (US); Adi Hajj-Ahmad, College Park, MD (US); Hui Su, College Park, MD (US)

(73) Assignee: UNIVERSITY OF MARYLAND, COLLEGE PARK, College Park, MD (US)

( * ) Notice: Subject to any disclaimer, the term of this patent is extended or adjusted under 35 U.S.C. 154(b) by 0 days.

(21) Appl. No.: 14/721,776

(22) Filed: May 26, 2015

(65) Prior Publication Data

US 2015/0356992 A1    Dec. 10, 2015

Related U.S. Application Data

(63) Continuation-in-part of application No. 14/093,399, filed on Nov. 29, 2013, now Pat. No. 9,363,467.

(60) Provisional application No. 62/002,591, filed on May 23, 2014, provisional application No. 61/731,353, filed on Nov. 29, 2012.

(51) Int. Cl.
*H04N 5/913* (2006.01)
*G11B 20/10* (2006.01)
*H04N 5/04* (2006.01)
*H04N 9/82* (2006.01)

(52) U.S. Cl.
CPC .. *G11B 20/10259* (2013.01); *G11B 20/10527* (2013.01); *H04N 5/04* (2013.01); *H04N 5/913* (2013.01); *H04N 9/8205* (2013.01); *H04N 2005/91342* (2013.01)

(58) Field of Classification Search
None
See application file for complete search history.

(56) References Cited

U.S. PATENT DOCUMENTS

| 2007/0030782 A1* | 2/2007 | Lee | G11B 20/1217 369/53.24 |
| 2008/0089202 A1* | 4/2008 | Robinson | G11B 20/00086 369/53.21 |
| 2009/0002564 A1* | 1/2009 | Barnhoefer | G09G 3/3406 348/687 |

OTHER PUBLICATIONS

Gerazov et al., "Tracking of Electrical Network Frequency for the Purpose of Forensic Audio Authentication", 2012, IEEE, pp. 1164-1169.

(Continued)

*Primary Examiner* — Eileen Adams
(74) *Attorney, Agent, or Firm* — Squire Patton Boggs (US) LLP

(57) ABSTRACT

Various systems and methods may benefit from determination of environmental signatures in recordings. For example, such signatures may aid forensic analysis and alignment of media recordings, such as alignment of audio or video recordings. A method can include extracting electric network frequency signals from an image sequence of a video recording or an audio recording. The method can also include synchronizing the video recording or the audio recording with at least one other datum based on the electric network frequency signals.

6 Claims, 5 Drawing Sheets

(56) References Cited

OTHER PUBLICATIONS

Liu et al., "Wide-Area Frequency as a Criterion for Digital Audio Recording Authentication", 2011, IEEE, pp. 1-7.
Garg et al., "Seeing ENF: Natural Time Stamp for Digital Video via Optical Sensing and Signal Processing", 2011, IEEE, pp. 23-32.
Hajj-Ahmad et al., "Instantaneous Frequency Estimation and Localization for ENF Signals", 2012, IEEE, pp. 1-10.
Ojowu et al., "ENF Extraction From Digital Recordings Using Adaptive Techniques and Frequency Tracking", IEEE, Aug. 2012, pp. 1330-1338.

* cited by examiner

# TECHNIQUES TO EXTRACT ENF SIGNALS FROM VIDEO IMAGE SEQUENCES EXPLOITING THE ROLLING SHUTTER MECHANISM; AND A NEW VIDEO SYNCHRONIZATION APPROACH BY MATCHING THE ENF SIGNALS EXTRACTED FROM SOUNDTRACKS AND IMAGE SEQUENCES

CROSS REFERENCE TO RELATED APPLICATIONS

This application is related to and claims the benefit and priority of U.S. Provisional Patent Application No. 62/002,591, filed May 23, 2014, the entirety of which is hereby incorporated herein by reference. This application is also related as a continuation-in-part to U.S. patent application Ser. No. 14/093,399, filed Nov. 29, 2013, the entirety of which is hereby incorporated herein by reference. This application also claims the benefit and priority of U.S. Provisional Patent Application No. 61/731,353, filed Nov. 29, 2012, the entirety of which is hereby incorporated herein by reference.

STATEMENT OF GOVERNMENT SUPPORT

This invention was made with government support under ECCS 1309623 awarded by NSF. The government has certain rights in the invention.

BACKGROUND

Field

Various systems and methods may benefit from determination of environmental signatures in recordings. For example, such signatures may aid forensic analysis and alignment of media recordings, such as alignment of audio or video recordings.

Description of the Related Art

Advancement in multimedia technologies has given rise to proliferation of such media recording devices as voice recorders, camcorders, digital cameras, and the like. A huge amount of digital information created using such devices can be stored on disks or uploaded on such social media platforms. Metadata describing such important information as the time and the place of recording may be manually added or can be embedded to a media recording using built-in clocks and global positioning system (GPS) in the recording devices. However, digital tools can be used to modify the stored information.

Forensic tools can be used to authenticate multimedia recordings using a signature, known as Electrical Network Frequency (ENF) signal, emanated from power networks. ENF is the supply frequency of electric power in power distribution networks, and its nominal value is 50 or 60 Hz depending on the geographic location. A property of the electric network frequency signal is that its value fluctuates around the nominal value: on the order of approximately 50-100 mHz in the United States. These fluctuations are due to variations in the load on the power grid and generally can be considered as random. Such randomly varying electric network frequency signal can be embedded in multimedia recordings due to the electromagnetic interference from nearby power lines in audio, and invisible flickering of electric powered indoor lightings.

Electric network frequency fluctuations based forensic analysis can thus be used for multimedia authentication tasks as time-of-recording estimation, timestamp verification, and clip insertion/deletion forgery detection. Electric network frequency can fluctuate due to dynamic changes in load demand and power supply, and these fluctuations travel over the power lines with a finite speed.

The electric network frequency signal can be extracted from power signals measured from a power outlet using a step-down transformer and a simple voltage divider circuit. The power signal is divided into time-frames, and frequency estimation algorithms are applied on each frame to determine its dominant frequency, thus estimating the instantaneous electric network frequency signal. The importance of the electric network frequency for multimedia forensics emerges because the electric network frequency can also be present in audio or video recordings due to electromagnetic influences in the place of recording. The electric network frequency variations extracted from a clean power signal match with the electric network frequency variations extracted from an audio signal recorded at the same time and in the same power grid as the power signal.

Digital video cameras have become increasingly popular, thanks to the rapid development of hardware and software technologies. As the amount of video data grows drastically every day, new applications arise for which multiple pieces of audio-visual data need to be analyzed and processed together.

When an event is recorded simultaneously by multiple independent video cameras and possibly from a variety of angles, combining the information in these videos may provide a better presentation and novel experience of the event than each recording alone. For example, a dynamic scene may be reconstructed that allows people to choose from different viewing angles of an event during playback. A video sequence of high space-time resolution can be obtained by combining information from multiple low-resolution video sequences of the same dynamic scene. Synchronization is a fundamental issue to enable these and other applications involving multiple pieces of audio-visual data, namely, the task of temporally aligning video or other multimedia signals.

SUMMARY

According to certain embodiments, a method can include extracting electric network frequency signals from a video recording or an audio recording. The method can also include synchronizing the video recording or the audio recording with at least one other datum based on the electric network frequency signals.

In certain embodiments, an apparatus can include at least one processor and at least one memory including computer program code. The at least one memory and the computer program code can be configured to, with the at least one processor, cause the apparatus at least to extract electric network frequency signals from a video recording or an audio recording. The at least one memory and the computer program code can be configured to, with the at least one processor, cause the apparatus at least to synchronize the video recording or the audio recording with at least one other datum based on the electric network frequency signals.

A non-transitory computer readable medium can, according to certain embodiments, be encoded with instructions that, when executed in hardware, perform a process. The process can include extracting electric network frequency signals from a video recording or an audio recording. The process can also include synchronizing the video recording or the audio recording with at least one other datum based on the electric network frequency signals.

An apparatus, in certain embodiments, can include means for extracting electric network frequency signals from a video recording or an audio recording. The apparatus can also include means for synchronizing the video recording or the audio recording with at least one other datum based on the electric network frequency signals.

BRIEF DESCRIPTION OF THE DRAWINGS

For proper understanding of the invention, reference should be made to the accompanying drawings, wherein.

DETAILED DESCRIPTION

Figure 1:
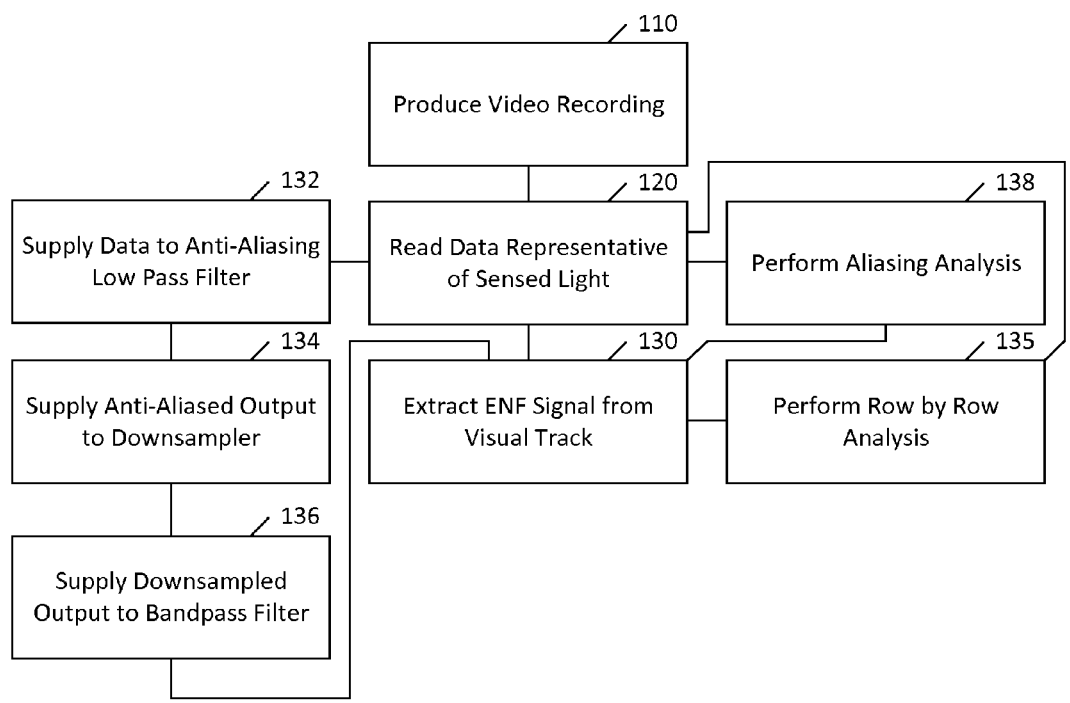
FIG. 1 illustrates a method according to certain embodiments.

Certain embodiments relate to techniques to extract electric network frequency signals from the audio or image sequences of video recordings, for example image sequences created by cameras equipped with rolling shutters. Recognizing the sequential exposure nature of the rolling shutter, certain embodiments treat the mean value of each line in an image frame as a sample, so that the sampling rate can be much higher than the frame rate. Additionally, certain embodiments address challenging issues of motion and brightness adjustments that can be encountered in video recording. Such compensation may permit extraction of electric network frequency signal(s) from a broader variety of videos. Furthermore, certain embodiments may permit aligning multiple videos and audios for multi-view/3D video rendering, audio-visual mashup, and the like.

Instantaneous electric network frequency can be estimated using Fourier transform based frequency estimation methods. For timestamp authentication and verification, similarity between the electric network frequency signals extracted from multimedia and the electric network frequency signal from power database at corresponding time can be measured by means of Normalized Cross-Correlation (NCC) coefficient. A high value of NCC can indicate the time at which recording took place. If the given multimedia query is of sufficiently long duration (for example, more than 10 minutes), the correlation coefficient metric between the electric network frequency signals can be reliably used to authenticate given multimedia recordings.

High resolution frequency estimation methods such as MUSIC and ESPRIT may provide better instantaneous frequency estimation of the electric network frequency signal for short segments and in the presence of higher noise level, as compared with the Fourier transform based methods. The performance of electric network frequency matching can further be improved by considering an autoregressive model of the signal. Based on this model, matching two electric network frequency signals by estimating the correlation coefficient between the corresponding innovations sequences may provide a better confidence in time-of-recording estimation and verification.

One use of the electric network frequency signal is as a timestamp for multimedia recordings. Additionally, the electric network frequency signal can be used to estimate or verify the place of recording of an audio or a video.

At an inter-grid level, it may be possible to differentiate between the recordings conducted across different grids, as the fluctuations in the electric network frequency signal may be different across different grids at the same time. At an intra-grid level, conventional approaches assumed that the electric network frequency signals across an interconnected power grid are similar at a given time period. However, variations may still be present in the frequency fluctuations at different locations due to the local changes in the load and the finite propagation speed of the effects of this load change to other parts of the grid.

Indeed, there exist differences among electric network frequency signals extracted from recordings taken in different locations within the same interconnected power grid. Localization protocols can then therefore be applied to estimate location of the recordings. The challenges arising due to the noisy nature of the electric network frequency signal from multimedia recordings can be variously addressed.

The fluctuations in the electric network frequency signal in the same grid may be due to the dynamic nature of the load on the grid. Power demand and supply in a given area can follow a cyclic pattern. For example, demand typically increases during evening hours in a residential neighborhood, as people switch on air-conditioning and other power units. For robust operation of the grid, any change in the load in a grid is regulated by a control mechanism. An increase in the load can cause the supply frequency to drop temporarily. The control mechanism can sense the frequency drop and can start drawing power from adjoining areas to compensate for the increased demand. As a result, the load in adjoining areas can also increase, which can lead to a drop in the instantaneous supply frequency. The overall power supply can be driven up to compensate for the rising load, which in turn leads to a drop in the instantaneous supply frequency in those regions. A similar mechanism can be used to compensate for an excess supply of power flow that leads to a surge in supply frequency.

A small change in the load in a given area may have a localized effect on electric network frequency in that area. However, a large change, such as one caused by a generator failure, may have an effect on the whole grid. In the eastern grid of US, these changes may propagate along the grid at a typical speed of approximately 500 miles per second.

Small and large changes in the load may cause location specific signatures in the electric network frequency patterns, and such differences may be exploited to narrow down the location of a recording within a power grid. Due to a finite speed of propagation of frequency disturbances across the grid, the electric network frequency signal may be more similar for locations close to each other as compared with the locations farther apart. Such a property of the electric network frequency signal propagation across the grid can be used for localization at a finer resolution within a grid by comparing the similarity of the electric network frequency signal in question with the electric network frequency databases that may be available for a set of locations.

Various embodiments may utilize these principles. For example, certain embodiments can estimate a high temporal-frequency resolution Electrical Network Frequency (ENF) signal from a given recording. This technique can be based on merging the harmonics of nominal value of electric network frequency to obtain a more robust estimate of the signal. Moreover certain embodiments can provide improved ENF matching by using a decorrelated electric network frequency signal for computing the correlation coefficient between the reference and the query EFN signal. Furthermore, a technology based on Electrical Network Frequency Signal can be used to estimate the location of recordings. Certain embodiments can be based on extracting a location specific signature signal from the electric network frequency signals. Moreover, certain embodiments can be used to estimate the location of multimedia recordings, such as audio and video recordings.

FIG. 1 illustrates a method according to certain embodiments. As shown in FIG. 1, a method can include, at 110, producing a video recording. Producing the video recording can include using light sensing circuitry to record incident light. The method can also include, at 120, reading data representative of sensed light in a visual track of a video recording. Video recordings in accordance with certain embodiments can have only visual track(s) or visual track(s) and audio track(s), as well as other metadata. Nevertheless, for certain aspects of certain embodiments each visual track may be separately considered from other tracks or metadata.

The method can also include, at 130, extracting an electric network frequency signal from the data representative of sensed light. There are a variety of ways that this extraction can be performed.

For example, to extract the electric network frequency signal, the recorded signals can be given as an input to an anti-aliasing low-pass filter with passband of 125 Hz. The resulting signal can be down sampled by a factor of 4 to reduce the sampling rate from an original sampling rate of 1 KHz to 250 Hz, and then passed through an equiripple band-pass filter with a narrow passband centered at 120 Hz.

After applying preprocessing to recorded signals using the method described above, the dominant instantaneous frequencies in each signal can be estimated in order to, for example, measure the fluctuations in electric network frequency signal as a function of time. For this purpose or other purposes, different types of frequency estimators based on parametric and nonparametric spectrum estimation techniques can be used. One example of a nonparametric method is a zero-crossing method.

In the zero-crossing method, a recorded signal can be divided into overlapping frames of $T_{frame}$ seconds each, with an overlap factor of 50%, and the number of times signal crosses zero in each frame can be counted. The dominant instantaneous frequency in each frame can be recorded as half of the zero-crossing count.

Spectrogram methods are also nonparametric methods. A spectrogram can calculate and display a short time Fourier transform (STFT) of the signal. To obtain the spectrogram of the electric network frequency signal, the signal can be divided into overlapping frames of $T_{frame}$ seconds each, with an overlap factor f of 50%. A high resolution 8192 points FFT can be taken for each frame, providing a frequency resolution of approximately 0.03 Hz for a preprocessed signal at 250 Hz sampling rate.

After obtaining the spectrogram of the electric network frequency signal, the following frequency domain techniques can be used to estimate the dominant instantaneous frequencies in the electric network frequency signal. First, in a maximum energy method the frequency corresponding to the maximum energy in each time bin of the spectrogram can be identified. The resulting one-dimensional signal can represent the instantaneous frequencies as a function of time. Next, in a weighted energy method, the weighted average frequency can be recorded in each time bin of the spectrogram. The average frequency can be obtained by weighing frequency bins around a nominal electric network frequency value with the corresponding energy present. For example:

$$F(n) = \frac{\sum_{l=L_1}^{L_2} f(n,l)|S(n,l)|}{\sum_{l=L_1}^{L_2} |S(n,l)|}$$

where $L_1 = \lfloor (f_{ENF}-0.5)N_F/f_s \rfloor$ and $L_2 = \lceil (f_{ENF}+0.5)N_F/f_s \rceil$; where $f_s$ and $N_f$ are the sampling frequency and the number of FFT points used to compute the spectrogram; f(n,l) and S(n,l) are the frequency and the energy in the frequency bin of the time-frame of the recorded signal's spectrogram, respectively. To estimate the dominant instantaneous frequency around a known frequency value, namely a nominal electric network frequency value, the value of l can be chosen to include the band within ±0.5 Hz of the electric network frequency of interest.

Parametric methods can also be used. Subspace methods are a class of parametric spectrum estimation techniques for frequency estimation of a sinusoidal signal submerged in additive noise. These methods can be used in applications where the length of a given signal is small, and the separation between the frequencies to be retrieved may be shorter than the Fourier resolution limit Electric network frequency signals in multimedia recordings can be quite noisy and the dynamic range of the frequency variations may be small. Subspace methods may assist in obtaining accurate estimation of electric network frequency signals and increasing the temporal resolution of electric network frequency matching in such scenarios.

Two such parametric methods include the multiple signal component (MUSIC) approach and the Estimation of Parameters using Rotational Invariant Techniques (ESPRIT) method. Variations on these methods, such as the Root MUSIC method can also be used, as explained in Garg et al. "'Seeing' ENF: Power-Signature-Based Timestamp for Digital Multimedia," IEEE Transactions on Information Forensics and Security, Volume 8, Number 9, September 2013, see also Garg et al. "'Seeing' ENF: Natural Time Stamp for Digital Video via Optical Sensing and Signal Processing," MM'11, Dec. 1, 2011, each of which is hereby incorporated herein by reference in its entirety together with the reference cited therein.

Thus, for example, at 132, the extracting can include supplying the data representative of sensed light to an anti-aliasing low pass filter. Moreover, at 134, the extracting can include supplying an output of the low pass filter to a down sampler. Then, at 136, the extracting can additionally include supplying an output of the down sampler to an equiripple band-pass filter with a narrow passband. More generally, the extracting can include, at 138, performing an aliasing analysis.

For example, electric network frequency signals recorded by video cameras under electric powered indoor lighting may experience significant aliasing due to the lower temporal sampling rate of cameras compared to the 100 Hz/120 Hz frequency components present in the light flickering. Electric network frequency signals in videos may appear at different predetermined frequencies, which can be analyzed from a sampling theorem.

As an example, the effect of a video recording in indoor lighting powered by a 50-Hz source can be considered.

Since the current changes polarity at twice the power mains frequency, the light in this case flickers at 100 Hz. Additionally, when the power mains signal slightly deviates from a perfect sinusoid form, higher harmonics of decaying energy can be present at integer multiples of 100 Hz. The bandwidth of these higher harmonics can also be greater than the main component because the practical electric network frequency signal of interest may be a narrowband signal and not a perfectly stable sinusoid.

Thus, the bandwidth of the $k^{th}$-harmonic component can be k-times the bandwidth of the main electric network frequency component at 100 Hz. In addition, in practical visual recordings, there may be little or no anti-aliasing lowpass filtering along temporal axis during the initial analog-to-digital acquisition.

The camera used for capturing video may be, for example, an NTSC standard camera with a frame-rate of 29.97 Hz. Because of the low temporal sampling rate as compared to the required Nyquist sampling rate to avoid aliasing, the resulting spectra may have periodic tiling of frequency components at $\pm 100 + 29.97$ k, k=0, $\pm 1$, $\pm 2$, . . . .

Because of the periodic nature of the resulting spectra, it may suffice to focus on replicas within one period. The multiple copies of the electric network frequency related components can appear in the temporal spectrum of the video signal around different but predetermined frequencies. These multiple copies can arise due to the presence of higher harmonics in the power mains signal, and may be combined strategically to obtain a better estimate of the video electric network frequency signal.

Because the magnitude spectrum of a real valued signal is symmetric about the y-axis, the original spectrum of the electric network frequency signal in indoor lighting can also have symmetric components at −100 Hz and its harmonics. After sampling by a video camera, a frequency component that is at −200 Hz in the spectrum of the original signal, can appear at 9.79 Hz in the recorded signal. Similarly, the component that was present at 100 Hz in the spectrum of the original signal can now appear at 10.09 Hz. As a result, replicas of the electric network frequency signal can be obtained at 9.79 Hz and 10.09 Hz. These replicas can be mirrored versions of each other with different bandwidths. Similar analysis can be performed on other combinations of different camera frame-rates and power mains frequencies to find the frequencies at which the main component and the second harmonic component of the signal appear.

The method can also or alternatively include performing row by row analysis, at 135. The row by row analysis may be useful in the case of CMOS imaging sensors. CMOS imaging sensors are increasingly used in a wide variety of imaging systems of still images and videos, such as mobile phone cameras, web cameras, and standalone digital cameras. Many consumer-end cameras equipped with CMOS sensors contain column-parallel readout circuits. These circuits read all the pixels in a row at the same time. The readout proceeds from a row to another in a sequential manner from top to bottom, with no overlap in the readout time of different rows. Such a sampling mechanism by the imaging sensors is referred to as a rolling shutter mechanism.

In a rolling shutter approach, each row of the image is exposed to the light at a different time, which can create artifacts for fast moving objects in the scene. However, as each frame of a video captured using rolling shutter cameras has undergone space-time sampling, this mechanism can be exploited for high speed photography and optical flow based applications, kinematics, and object pose estimation. The spatial-temporal sampling nature of the rolling shutter can provide a potentially high sampling rate of the electric network frequency signal as compared to the traditional CCD-based cameras.

The electric network frequency signal captured in recordings using CCD camera with 29.97 fps and 30 fps in the 60 Hz power frequency region may be expected to appear at 0.12 Hz and DC frequency, respectively. The electric network frequency signal at these aliased frequencies can be obscured by the content frequency of the video recordings. By exploiting high temporal sampling on a line by line basis from CMOS camera recordings, aliasing can be mitigated on the frame level.

To extract electric network frequency signals from videos recorded using CMOS cameras, the spatial average of each row can be used as a sample. The resulting signal can be passed through a bandpass filter in the electric network frequency band of interest. The bandpassed signal can be downsampled to 1000 Hz sampling frequency, and resultant signal can be used for frequency estimation using, for example, the methods described elsewhere herein.

The method can further include, at 140, determining a location of the sensed light based on the extracted electric network frequency signal. Alternatively, or in addition, the method can include, at 145, determining whether tampering of the video recording has occurred by comparing the electric network frequency signal to another sample of electric network frequency signal. For example, the other sample can be either an adjacent or nearby sample in a visual track or a sample from an allegedly corresponding time in an audio track.

Trying to correlate the electric network frequency signal to another electric network frequency signal may pose a variety of challenges. For example, a Normalized Cross-Correlation (NCC) function between two electric network frequency signals may have multiple local maximum peaks. Such local maxima may arise from the correlated structure of the electric network frequency fluctuations. Because of such correlation, the electric network frequency value at time instant n may be highly correlated with the electric network frequency value at another time instant n−k, and may give false alarm in estimation of time-of-recording or other forensics analysis on a given video. This situation can be resolved by, for example, performing a decorrelation of the electric network frequency signal.

An autoregressive (AR) model can be used for electric network frequency signals. Statistically, the electric network frequency signal may be a piecewise stationary signal. According to the Wold decomposition theorem in statistical signal processing, a stationary signal can be decomposed into an innovation process and a predictable process, and these two processes are uncorrelated with each other, according to the theorem. So, the zero-mean shifted electric network frequency signal, F(n), at time n, can be modeled as a linear combination of its past samples and a white noise process, v(n):

$$F(n) = \sum_{k=1}^{L} a_k(n) F(n-k) + v(n)$$

where $a_1(n)$, $a_1(n)$, . . . , $a_L(n)$ represent the weighing coefficients.

Here, v(n) represents a signal that is independent of its past samples and brings innovations to the electric network frequency signal F(n).

The parameters $a_1(n), a_1(n), \ldots, a_L(n)$ can be estimated using the Yule-Walker equations. Then the definition of F(n) can be applied to estimate the process v(n). Finally, the innovation process can be used to perform correlation-based matching analysis.

Figure 2:
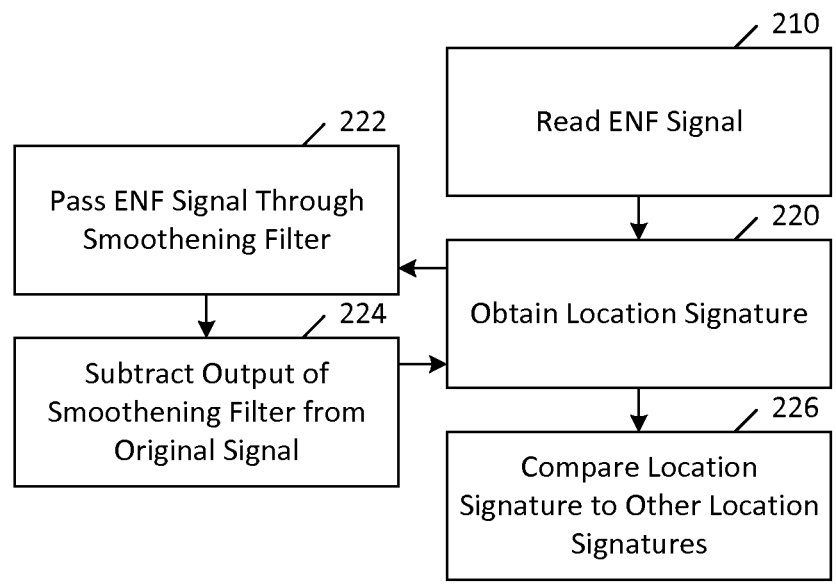
FIG. 2 illustrates another method according to certain embodiments.

FIG. 2 illustrates another method according to certain embodiments. As shown in FIG. 2, a method can include, at 210, reading an electric network frequency signal. The method can also include, at 220, obtaining a location signature for the electric network frequency signal. The location signature can be on a smaller scale than a grid. For example, the scale can be the scale of a metropolitan area, county, or the like. In a particular example, the scale may be on the order of 10% or less of the grid. In other words, the location signature can identify the location to a degree of accuracy that is significantly more precise than simply the grid. For example, the location signature may be able to distinguish a location signature corresponding to the Philadelphia area from a location signature corresponding to the New York City area, and each of those from a College Park, Md. area.

The obtaining the location signature can include, at 222, passing the electric network frequency signal through a smoothening filter, which can be one filter or a combination of filters. The obtaining the location signature can also include, at 224, subtracting an output of the smoothening filter from the electric network frequency signal.

Also, the obtaining the location signature can include, at 226, comparing the location signature to at least one other location signature having a known location within a grid.

Location signatures can be obtained in various ways. For example, as mentioned above, the electric network frequency signal can be represented as f(n). Then, a smoothened version of the signal can be represented as follows:

$$f_{smooth}(n) = \sum_{k=0}^{N-1} w(k) f(n-k)$$

where w(k)=1/N for 0<=k<=N-1. This smoothened version of the signal can be subtracted from the original signal to yield a high pass version of the signal. A correlation coefficient between two high pass versions of recordings can be used as a measure of the distance between their respective locations. An order 3 smoothening filter or an order 7 smoothening filter can be used.

Once distances between known recordings and an unidentified recording are known, the position of the unidentified recording can be estimated using a triangulation or multilateration technique.

An alternative approach may be a half-plane intersection technique. Half-planes can be hyper-planes satisfying distance relationships for a given correlation relation. In two dimensions, half planes can be separated by a straight line. Each additional constraint can provide increasingly fine localization. However, near the half plane boundary, a small error can lead to the wrong half plane being selected. In certain embodiments, this issue can be avoided by refusing to use constraints that are within a predetermined threshold of the half plane boundary.

The constraints for a half plane approach may be recordings in a plurality K of anchor cities. The location of K anchor cities by $P_1=\{x_1, y_1\}, P_1=\{x_1, y_1\}, \ldots, P_K=\{x_K, y_K\}$. The electric network frequency data collected at all anchor cities can be provided, along with their known locations.

Based on this information, a localization protocol can be used to estimate the unknown location of a city node (denote by A) that lies in a set of locations described by convex hull of $P_1, P_2, \ldots P_K$ using electric network frequency data collected at city A and all the anchor nodes.

If the distance of $P_i$ from city A is greater than the distance of $P_j$ from city A, then generally $p_{j,A} > p_{i,A}$ holds true. Thus, it can be concluded that the location of city A lies in the half plane described by the set of points $\widehat{P_{i,j}}$ given by the following equation:

$$\widehat{P_{i,j}} = \begin{cases} \{X: \|X - P_i\|_2 > \|X - P_j\|_2, X \in D\} & \text{if } p_{j,A} > p_{i,A} \\ \{X: \|X - P_j\|_2 > \|X - P_i\|_2, X \in D\} & \text{if } p_{i,A} > p_{j,A} \end{cases}$$

where D is the domain of the solution. Using the correlation value obtained from all the anchor nodes, the set of feasible points can be further reduced by computing the intersection of all the feasible halfplanes as follows:

$$\widehat{P_A} = \cap_{i,j} \widehat{P_{i,j}} \, i,j \in \{1,2,\ldots,K\}, i \neq j$$

The conditions on the correlation coefficient can be hard decision rules, and may not take into account the noisy nature of correlation coefficients estimated between two cities electric network frequency data. For example, when the value of correlation coefficients for $i^{th}$ and $j^{th}$ location are very close to each other such that the absolute value of the difference between $p_{j,A}$ and $p_{i,A}$ is less than $\epsilon$ for a very small value of $\epsilon$, then the confidence in assigning a region to the feasible solution set $\widehat{P_{i,j}}$ may be reduced.

To compensate for such values of correlation coefficients, the feasible set $\widehat{P_{i,j}}$ can be replaced with the following equation:

$$\widehat{P_{i,j}} = \begin{cases} \{X: \|X - P_i\|_2 > \|X - P_j\|_2, X \in D\} & \text{if } p_{j,A} > p_{i,A} + \varepsilon \\ \{X: \|X - P_j\|_2 > \|X - P_i\|_2, X \in D\} & \text{if } p_{i,A} > p_{j,A} + \varepsilon \end{cases}$$

In this way, the feasible set can avoid the use of constraints that have more than a slight chance of error due to noise.

Further localization may be achievable, for example, by consideration of various quantitative features of an electric network frequency. For example, various quantitative features can be extracted. For the purposes of the present discussion, a set of electric network frequency signal segments, s[n], of fixed size S from candidate power grids can be considered. These electric network frequency segments can correspond to electric network frequency-containing signals whose size is on the order of minutes.

The mean of an electric network frequency segment is one example of a feature component to include. Another feature is the variance of the segment. Similarly, a further feature can be the dynamic range of the segment, namely the maximum electric network frequency value minus the minimum value. For other features, a transformation can be applied to the electric network frequency segment and the statistical properties of the transformation can be treated as features.

For example, wavelet signal analysis can be used to study signals at multiple time-frequency resolutions. An L-level dyadic wavelet decomposition can be applied, in which each level can provide an approximation to the original signal and the detailed variations at a specific level of resolution. The variances of the high-pass band can be calculated of each decomposition level, which can correspond to the details. The variance of the lowest time-frequency band, the approximation, can also be calculated. These can variances can be candidate features.

Figure 3:
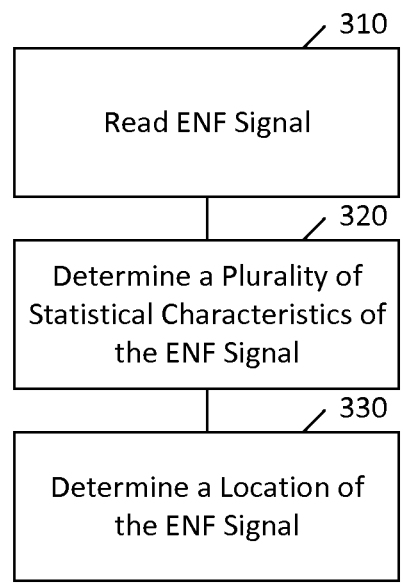
FIG. 3 illustrates a further method according to certain embodiments.

FIG. 3 illustrates a further method according to certain embodiments. The method of FIG. 3 may not require concurrent reference electric network frequency signal data.

The method can include, at 310, reading an electric network frequency signal from a recording. The electric network frequency signal can be read according to any of the methods mentioned herein or by any other suitable method.

The method can also include, at 320, determining a plurality of statistical characteristics of the electric network frequency signal. The statistical characteristics can be applicable to an electric network frequency signal regardless of whether it is obtained from an audio recording, a video recording, or a power recording.

The method can further include, at 330, determining a location of the recording based on the plurality of statistical characteristics. The plurality of statistical characteristics can include at least two of a mean of the electric network frequency signal, a variance of the electric network frequency signal, and a dynamic range of the electric network frequency signal. Likewise, the determining the plurality of statistical characteristics can include applying a transformation to a segment of the electric network frequency signal and examine statistical properties of the transformation. The location determination can be made based on the statistical characteristics as distinct from and without relying on any concurrent recordings.

A system to implement this method may be manually configured or may be trained based on known data. For example, a supervised learning model, such as a support vector machine (SVM) can be used for classification. Weighted SVM can similarly be used, particularly for addressing imbalanced data. It may be beneficial to use data of the same type for training and for classification. For example, if the goal is to classify an electric network frequency from a visual track, it may be best to train the system using visual track electric network frequency data. Similarly, if the goal is to classify an electric network frequency from an audio track, it may be best to train the system using audio track electric network frequency data.

In certain embodiments, other applications of an extracted electric network frequency are possible. For example, an extracted electric network frequency signal can be used to synchronize multimedia. Because the electric network frequency signal can be treated as a continuous-time random process, the realization of the electric network frequency in each recording may serve as a timing fingerprint. Synchronization of audio and video recordings can therefore be performed by matching and aligning their embedded electric network frequency signals.

The electric network frequency based method of synchronization does not need to rely on having common audio and visual contents between the multiple recordings to be synchronized. Taking video synchronization for example, the conventional approaches based on visual cues may not work well in situations where there are arbitrary camera motions or the view overlap is insufficient, while the electric network frequency based method may not be affected by these adverse conditions, or may not be adversely affected in a similar way.

For example, in a first recording electric network frequency may be present at a variety of harmonics, and, for example, most strongly around 360 Hz. In a second related recording, the electric network frequency may be noisier and may be most strongly present around 120 Hz and 360 Hz. The electric network frequency of the first recording can be extracted from around 360 Hz. For the second recording, a spectrum combining technique for electric network frequency estimation can be used to combine the electric network frequency traces from around 120 Hz and 360 Hz to arrive at a more reliable electric network frequency estimate. The resulting electric network frequency signal may still be noisy and may be cleaned by locating outliers and replacing them using linear interpolation from surrounding electric network frequency values. The cleaned electric network frequency signal from the second recording can then be aligned (or checked for alignment with) the electric network frequency signal of the first recording.

Other implementations are also possible. For example, in the case of multiple security cameras in a surveillance situation, the electric network frequency signal can be used to authenticate a common time stamp amongst a plurality of cameras, even when the cameras are located in different rooms. For example, an authentication process can automatically run periodically to compare electric network frequency signals from each of a plurality of video feeds to compare whether they sufficiently align with one another or whether one or more of the video feeds may have been altered. This can be done without imposing any special requirements on the lighting of rooms, where much of the lighting is provided by fluorescent or similar light sources.

Similarly, electric network frequency extracted from multiple streams can be used to align the streams. The streams can be visual or audio tracks or whatever detectable sources of electric network frequency, or their combinations. The applications go beyond just security, and can also synthesize multiple-view multiple-modality streams. For example, streams from a sports competition can be synchronized from multiple angles using normal cameras at hand, without expensive pre-installed equipment. This may particularly valuable in the case of indoor sports that are illuminated by fluorescent lighting, such as racquetball, basketball, or volleyball.

Additionally, such synchronization can be applied when the audio tracks of the various streams each include electric network frequency, such as from power supplies or the like. This use of synchronization can be applied even if the particular audio track has no significant audio overlap with other audio tracks, such as feeds from opposite ends of a race track or football field. Thus, synchronization of the video feeds can be performed based on audio tracks without the need for corresponding audio data on the tracks.

In such synchronizations, a power electric network frequency record can be used as a baseline. If, initially, there is no match between audio electric network frequency and power electric network frequency, outliers can be pinpointed and removed.

In certain cases, it may be easiest to obtain an electric network frequency from a video image of a stationary object. Thus, if a camera angle changes with respect to a view, the system can perform a transformation to treat the image as if it were stationary. Another alternative is to ignore portions of the image that include significantly changing aspects, such as a foreground portion, while considering only the relatively static portions of the image, such as the background portion.

Certain characteristics may make electric network frequency based synchronization effective, in certain embodiments. For example, the electric network frequency traces in the audio and video recordings may need to be at least strong enough so that reliable electric network frequency signals can be estimated. The temporal overlap between recordings to be synchronized may assist the process, as the larger the overlap, the more accurate alignment of the electric network frequency signals may be.

In certain embodiments, electric network frequency traces embedded in video soundtracks can be used for video synchronization. After taking the soundtracks from two video recordings to be synchronized, each soundtrack can be divided into overlapping frames of length $L_{frame}$ seconds. The overlap between adjacent frames can be denoted as $L_{overlap}$ in seconds. So the shift from one frame to the next can be $L_{shift}=L_{frame}-L_{overlap}$. For every frame, the dominant frequency can be estimated around the nominal value of the electric network frequency.

The values of the estimated frequency can be concatenated together to form the electric network frequency signal of each soundtrack. The normalized cross correlation coefficients can be calculated with different lags between the ENF signals. The lag corresponding to the maximum correlation coefficients can be identified as the temporal shift between the two videos.

The accuracy of synchronization can be useful in applications involving multiple videos or other multiple multimedia records. Although most demonstrations of electric network frequency being picked up by digital audio and video recordings in areas of electrical activities were reported in the recent decade, the presence of electric network frequency can be found in analog recordings made throughout the second half of the 20th century.

Using electric network frequency to analyze historical recordings can have many useful applications for forensics and archivists. For instance, many 20th century recordings are important cultural heritage records, but some lack necessary metadata, such as the date and time of recording.

Also, the need may arise to timestamp old recordings for investigative purposes, and electric network frequency may provide a way to do that.

Certain embodiments may also address simultaneous video recordings that lack what was traditionally viewed as the necessary visual similarity. For example, in certain embodiments, the cameras can be fixed during recording, and there can be some view overlap between the videos to be synchronized. However, in certain embodiments, there may be no constraints on camera motion, camera calibration and no requirement of any view overlap when using the electric network frequency signals extracted from the soundtracks for synchronization of video recordings. There can be substantially different viewpoints and depth of the cameras. Indeed, there may not need to be any overlapping audible sounds in the soundtrack to enable synchronization. Thus, for example, recordings from separate rooms can be synchronized, even when the soundtracks themselves do not contain any common audible sounds.

Such synchronization is not limited to audio techniques. Visual recordings can also capture electric network frequency traces, as mentioned above. Indoor lightings such as fluorescent lights and incandescent bulbs vary the light intensity in accordance with the AC voltage supplied, resulting in subtle flickering in the lights.

The frequency of the flickering is usually twice that of the electric network frequency, as the light intensity is in proportion to the square of the input voltage. Although the flickering may be unnoticeable to human eyes, cameras can often capture it in video recordings. With signal processing techniques, certain embodiments can reveal the traces left by the flickering of lights in video recordings and use them to extract the electric network frequency signal.

In certain embodiments, a method can include taking the mean of the pixel values in every image of a video sequence as source signal, and then using spectrogram analysis to estimate the embedded electric network frequency signal.

The aliasing effect can present an obstacle to this approach. By taking one sample from every frame, the electric network frequency signal that appears at harmonics of 50 or 60 Hz is essentially sampled temporally at the frame rate of the video recordings. Current consumer digital cameras usually adopt a frame rate that is around or lower than 30 fps. The electric network frequency signals therefore suffer from severe aliasing effect due to insufficient sampling speed.

For example, the nominal value of the electric network frequency in the US is 60 Hz. If the frame rate is exactly 30 Hz, the electric network frequency signal in the source signal that is obtained by taking the mean of the image sequence will be shifted to around 0 Hz, i.e., the DC frequency. As a result, it would be impossible to estimate the electric network frequency signal because of low signal-to-noise ratio, as most energy of the source signal resides in the DC frequency range.

Rolling shutters are commonly adopted for complementary metal-oxide semiconductor (CMOS) camera sensors. Unlike global shutters often employed in charge-coupled device (CCD) sensors that record the entire frame from a snapshot of a single point in time, a camera with a rolling shutter scans the vertical or horizontal lines of each frame in a sequential manner. As a result, different lines in the same frame can be exposed at slightly different times. In addition, some rolling shutter may adopt a possible idle period between finishing the scan of one frame and proceeding to the next frame.

Since the pixels in different rows or columns are exposed at different times but are displayed simultaneously during playback, the rolling shutter may cause such spatial distortions as skew, smear, and other image artifacts, especially for scenes with fast-moving objects and rapid flashes of light.

The sequential read-out mechanism of rolling shutter has been conventionally considered detrimental to image/video quality due to its accompanying artifacts. However, the rolling shutter can be exploited with computer vision and computational photography techniques. Moreover, the rolling shutter can resolve the issue of insufficient sampling rate for estimating the electric network frequency signal from the image sequence of video recordings. By treating each line of the frame as a sample point, the sampling rate can be much higher than the frame rate.

Although certain embodiments may be limited to videos of static scenes, in other embodiments the rolling shutter can be used for extracting electric network frequency signals from other video recordings, and can even handle videos with camera and/or object motion(s).

For example, consider a rolling shutter that scans a frame row-by-row. Thus, there can be a video signal, $s(r, c, n)$, where $1 \leq r \leq R$, $1 \leq c \leq C$ and $1 \leq n \leq N$ denote the row index, column index and frame index, respectively. The video signal can contain mainly two components: one is the visual component v corresponding to the visual scene; and the other is the electric network frequency component e: $s(r, c, n) = v(r, c, n) \, e(r, c, n)$.

Thus, a spatial average of each row in the video can be taken as the source signal to estimate the electric network frequency signal.

Even though the signal-to-noise-ratio (SNR) of e in s may be low in the presence of the visual component v, this can be addressed. For fixed spatial indices r and c, the visual component v(r, c, n) as a function of n may be a low-pass signal.

Thus, in order to suppress the effect of v and extract the electric network frequency component e, certain embodiments may apply high-pass filtering to the video signal s.

When the scene in the video recording is static, the visual signals of every frame in the video are identical, i.e., v(r, c, n)=v(r, c). Under this assumption, s(r, c, n)=v(r, c) e(r, c, n). A high-pass filter can be applied to s by subtracting from it its mean value across all frames:

$$\hat{s}(r, c, n) = s(r, c, n) - \bar{s}_n(r, c)$$

$$= s(r, c, n) - \frac{1}{N}\sum_{m=1}^{N} s(r, c, m)$$

$$= e(r, c, n) - \frac{1}{N}\sum_{m=1}^{N} e(r, c, m).$$

Here e(r, c, n) can be the sinusoidal electric network frequency signal sampled at the $r^{th}$ row and $c^{th}$ column in the $n^{th}$ frame. For any given r and c, e(r, c, n) as a function of n=1, 2, ..., N is essentially a sinusoid sampled at the frame rate of the video recording.

Since the frequency of the electric network frequency signal is changing over time, e(r, c, n) for n=1, 2, ..., N tends to have random phases, therefore the average of these samples is close to 0, i.e.

$$\bar{e}_n(r, c) = \frac{1}{N}\sum_{m=1}^{N} e(r, c, m) \approx 0.$$

This leads to $$\hat{s}(r,c,n) \approx e(r,c,n).$$

After the high-pass filtering, the SNR of the electric network frequency signal in ŝ is much higher than that in the original video signal s. Thus, the spatial average of each row in ŝ(r, c, n) can be used as the source signal to estimate the electric network frequency signal:

$$R(r, n) = \frac{1}{C}\sum_{c=1}^{C} \hat{s}(r, c, n).$$

R(r, n) can be referred to as the row signal. The frequency estimation techniques discussed earlier can be used to estimate the electric network frequency signal from the row signal.

As mentioned above, the previous example relied on a static video frame. Nevertheless, in some cases the video may contain object motion. In such case, if the identical approach described above were applied, the object motion could prevent the proper functioning of the method.

Nevertheless, if some portion of the video (for example, background or foreground) is static, then certain embodiments may use these static regions to estimate the electric network frequency signal. Following the notations of last discussion, given two image frames s(r, c, n) and s(r, c, m), the region(s) of interest may be the region(s) that are not affected by object motion in either of the frames. The mutual motion-free regions between s(r, c, n) and s(r, c, m) can be represented by a binary matrix $M^{n,m}(r, c)$, defined as $$M^{n,m}(r, c) = \begin{cases} 1 & \text{if frame } n \text{ and frame } m \text{ are both static at pixel } (r, c) \\ 0 & \text{otherwise} \end{cases}$$

The motion-free regions can be found by any suitable technique, such as thresholding on the pixel-wise differences of the pixel intensity between the two images. Other techniques are also permitted. For example, a region can be designed as "motion-free" based on a multiframe analysis over a period of seconds or minutes, if desired. Alternatively, a motion-free region may be manually configured.

A high-pass filter can be applied to the video signal by subtracting from the video signal a smoothened version of the original signal. For an image frame s from the video sequence, the mutual motion-free regions in all the other frames can be searched. The pixel values of the frames in their respective motion-free regions can be averaged to form a smoothened version of s, which can then be subtracted from s:

$$\hat{s}(r, c, n) = s(r, c, n) - \frac{1}{\sum_{m \neq n} M^{n,m}(r, c)} \sum_{m \neq n} s(r, c, m) \cdot M^{n,m}(r, c)$$

The row signal can be obtained by taking the row average of ŝ from which the electric network frequency signal can be estimated.

There may be other challenges besides object motion. For example, many cameras are equipped with a brightness control mechanism that is designed to adjust the camera sensor's aperture and/or sensitivity to light in response to changing illumination conditions, so that the overall brightness of the acquired image remains visually pleasing, or so a putatively important object in the image receives the appropriate level of perceived illumination.

This brightness compensation issue can be addressed in various ways. For example, the brightness compensation can be modeled as a linear transform. Given two frames s(r, c, n) and s(r, c, m), the following modified equation may hold:

$$s(r,c,n) = a^{n,m} \cdot s(r,c,m) + b^{n,m}.$$

For a frame s(r, c, n), the pixel values in the static background regions can be used to estimate the parameters $a^{n,m}$ and $b^{n,m}$. For brightness change compensation, the modified equation can be applied to each frame s(r, c, m), yielding the following:

$$\hat{s}(r, c, n) = s(r, c, n) - \frac{1}{\sum_{m \neq n} M^{n,m}(r, c)} \cdot \sum_{m \neq n} (a^{n,m} \cdot s(r, c, m) + b^{n,m}) \cdot M^{n,m}(r, c)$$

Using this mechanism for brightness change compensation, the electric network frequency signal can exhibit consistent variations with the electric network frequency signal that would have been obtained absent the brightness change.

A third area of challenge can be compensating camera motion. In previous discussions, it was assumed that the camera was fixed during recording, so that the pixels in different image frames were spatially aligned. In practice, people may hold the camera by hand to make a video recording, and for this or other reasons the camera may undergo certain movements. In such a case, the above-described methods may yield inaccurate results.

In order to address situations with camera motion, it may be easier to consider videos of static scenes. For two image frames s(r, c, n) and s(r, c, m), $(\delta_r^{n,m}, \delta_c^{n,m})$ can denote the pixel-wise shift between the two frames due to the camera motion:

$$s(r,c,n)=s(r+\delta_r^{n,m},c+\delta_c^{n,m},m).$$

To compensate for the camera motion, certain embodiments may shift the pixels in two frames relatively by $(\delta_r^{n,m}, \delta_c^{n,m})$ so that they are spatially aligned. The registered frames can then be processed as described above. Considering the camera motion compensation, the equation can become $$\hat{s}(r, c, n) = s(r, c, n) - \frac{1}{N}\sum_{m=1}^{N} s(r + \delta_r^{n,m}, c + \delta_c^{n,m}, m),$$

and the electric network frequency signal can then be estimated from ŝ(r, c, n).

Optical flow methods can be used to estimate the pixel-wise displacement between image frames. These methods can calculate the motion field $(V_r, V_c)$ between two frames s(r, c, n) and s(r, c, n+δ_n) based on the optical flow equation $$\frac{\partial s}{\partial r}V_r + \frac{\partial s}{\partial c}V_c + \frac{\partial s}{\partial n} = 0,$$

and certain additional conditions and constraints for regularization.

Certain embodiments may, therefore, be applicable for example to some surveillance recordings, video recordings that may have been muted or for which the soundtrack may have been edited. In general, certain embodiments may be applicable to videos that have no reliable audio available. As an alternative, therefore, certain embodiments may extract the electric network frequency signal from the image sequence of the visual track. This signal may be used for synchronization purposes or also to authenticate the soundtrack by comparison with an electric network frequency signal obtained from the soundtrack at a corresponding time.

In certain embodiments, a software tool running on hardware can automatically align two video recordings using the underlying electric network frequency signals. The tool can take as input two video files, can extract electric network frequency signals with options and parameters specified by a user, and can synchronize the video sequences by aligning the extracted electric network frequency signals.

For each video, a user may be allowed to use either the audio track or the image sequence as the source to estimate the electric network frequency signal. When using the audio track as the source, the user can examine the spectrogram and select the best frequency band for electric network frequency extraction. When using the image sequence as the source, the user can choose appropriate options for electric network frequency extraction to ensure estimation accuracy.

The tool can provide the user with a brief overview of the video to facilitate the configuration of options, including whether the video is static or contains motion, whether automatic brightness control was employed, and whether the camera taking the video was in motion. Once the two electric network frequency signals are extracted, the time lag can be found and the synchronized videos may be saved and played.

Although in this example manual techniques were used to determine whether a video contains motion, computer techniques for automatic motion detection can be substituted for the manual technique. Similarly, the tool may automatically assume that the camera may have been in motion when analyzing the video, rather than receiving manual input regarding this option.

Figure 4:
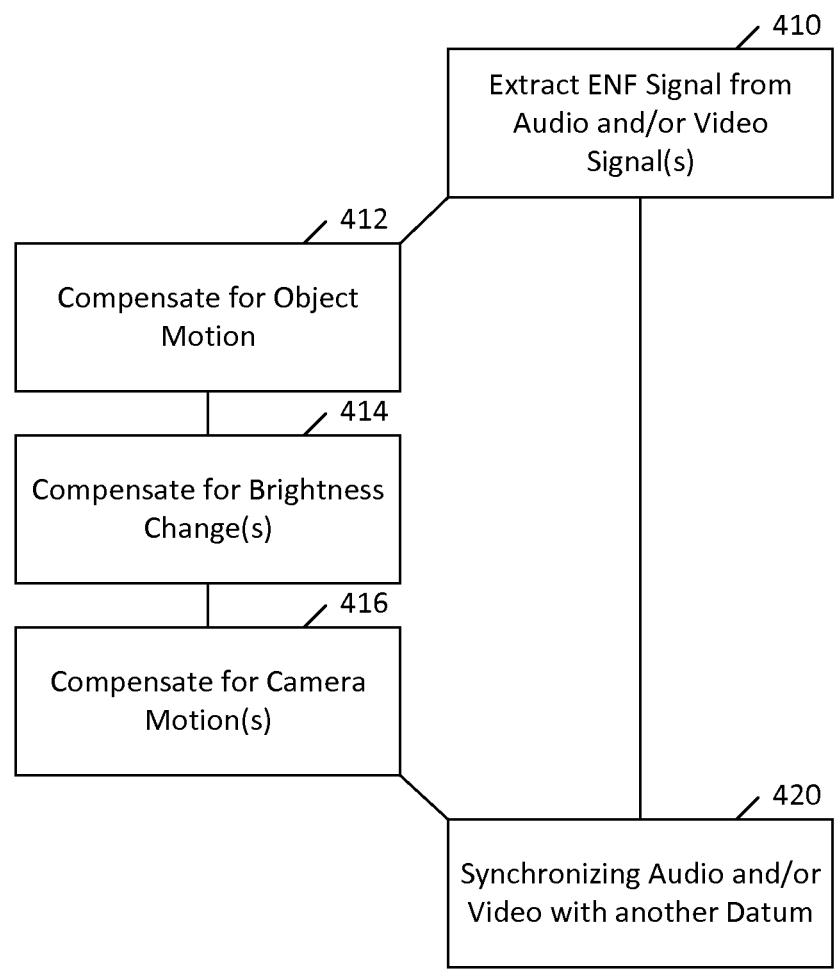
FIG. 4 illustrates an additional method according to certain embodiments.

FIG. 4 illustrates an additional method according to certain embodiments. As shown in FIG. 4, a method can include, at 410, extracting electric network frequency signals from an image sequence of a video recording or an audio recording.

The extracting electric network frequency signals can include extracting electric network frequency signals from an image sequence of the video recording. More particularly, in certain embodiments, the extracting can include taking a sample as a mean value for each row or column of an image frame of the video recording.

The extracting electric network frequency signals can include extracting electric network frequency signals from frames containing scenes of at least one moving object. Thus, at 412, the method can include compensating for object motion. For example, the extracting can be limited to extraction from at least one static region of the video recording. Other object motion compensation techniques are also permitted.

Additionally, the extracting electric network frequency signals can include, at 414, compensating at least one brightness change in the video recording. The compensating can include applying a linear transformation to the video recording. Other brightness change compensation techniques are also permitted.

Furthermore, the extracting electric network frequency signals can include, at 416, compensating at least one camera motion in the video recording. The compensating can include applying an optical flow, as described above, to calculate a pixel displacement between frames of the video recording.

The method can also include, at 420, synchronizing the video recording or the audio recording with at least one other datum based on the electric network frequency signals. For example, the synchronizing can include aligning at least one second video recording with the video recording or the audio recording. Alternatively, or in addition, the synchronizing can include aligning at least one second audio recording with the audio recording or the video recording.

The above-described methods can be variously implemented.

Figure 5:
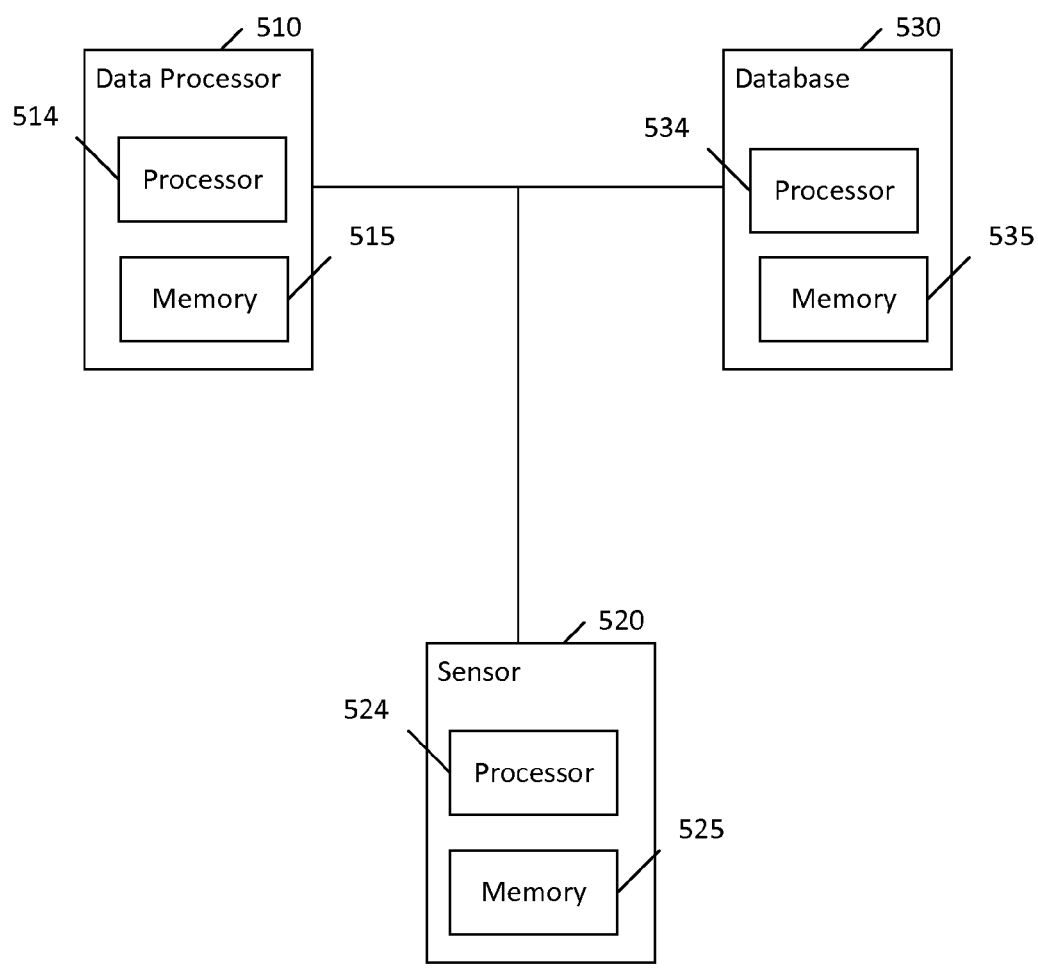
FIG. 5 illustrates a system according to certain embodiments.

FIG. 5 illustrates a system according to certain embodiments of the invention. In one embodiment, a system may include multiple devices, such as, for example, at least one data processor 510, at least one sensor 520, and at least one database 530. In certain systems, data processor 510, sensor 520, database 530, and a plurality of other devices may be present. Other configurations are also possible. The data processor 510 may be equipped for processing, storing, and displaying information relating to electric network frequency signals. The sensor 520 may be equipped to capture an electric network frequency signal either directly or as part of an audio, video, or power recording. The database 530 may be equipped to store electric network frequency signal data, raw records, statistical characteristics of electrical network frequency systems, and the like.

Each of these devices may include at least one processor, respectively indicated as 514, 524, and 534. At least one memory can be provided in each device, as indicated at 515, 525, and 535, respectively. The memory may include computer program instructions or computer code contained therein. The processors 514, 524, and 534 and memories 515, 525, and 535, or a subset thereof, can be configured to provide means corresponding to the various blocks of FIGS. 1-4. Although not shown, the devices may also include user interfaces, including displays, touch screens, keyboards, and the like.

Processors 514, 524, and 534 can be embodied by any computational or data processing device, such as a central processing unit (CPU), application specific integrated circuit (ASIC), or comparable device. The processors can be implemented as a single controller, or a plurality of controllers or processors.

Memories 515, 525, and 535 can independently be any suitable storage device, such as a non-transitory computer-readable medium. A hard disk drive (HDD), random access memory (RAM), flash memory, or other suitable memory can be used. The memories can be combined on a single integrated circuit as the processor, or may be separate from the one or more processors. Furthermore, the computer program instructions stored in the memory and which may be processed by the processors can be any suitable form of computer program code, for example, a compiled or interpreted computer program written in any suitable programming language.

The memory and the computer program instructions can be configured, with the processor for the particular device, to cause a hardware apparatus such as data processor 510, sensor 520, and database 530, to perform any of the processes described above (see, for example, FIGS. 1-4). Therefore, in certain embodiments, a non-transitory computer-readable medium can be encoded with computer instructions that, when executed in hardware, perform a process such as one of the processes described herein. Alternatively, certain embodiments can be performed entirely in hardware.

Furthermore, although FIG. 5 illustrates a system including a data processor, sensor, and database, embodiments of the invention may be applicable to other configurations, and configurations involving additional elements. The features of the data processor 510, database 530, and sensor 520 are shown connected by a physical bus, but the components can be connected in other ways and do not need to be permanently connected to other components.

Certain technologies may pose particular challenges. For example, forgers may have access to recorded power electric network frequency and may be able to compensate a video or audio track to correspond to the recorded power electric network frequency. Similarly, some camera systems use white balancing to automatically adjust sensitivity to light. These changes in sensitivity may make it difficult to accurately obtain an electric network frequency, unless the white balancing events can be identified and compensated for. Other noise factors can also produce distortion of the electric network frequency, such as pixel value variations due to environmental conditions, such as shadows. Certain embodiments may advantageously address these challenges and may provide benefit by expanding the scope of available multimedia for synchronization, authentication, or other purposes.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. In order to determine the metes and bounds of the invention, therefore, reference should be made to the appended claims.

We claim:

1. A method, comprising:
   extracting electric network frequency signals from a video recording or an audio recording; and
   synchronizing the video recording or the audio recording with at least one other datum based on the electric network frequency signals, wherein the extracting comprises taking a sample as a mean value for each row or column of an image frame of the video recording.

2. A method, comprising:
   extracting electric network frequency signals from a video recording or an audio recording; and
   synchronizing the video recording or the audio recording with at least one other datum based on the electric network frequency signals, wherein the extracting electric network frequency signals comprises extracting electric network frequency signals from frames containing scenes of at least one moving object.

3. The method of claim 2, wherein the extracting is limited to extraction from at least one static region of the video recording.

4. An apparatus, comprising:
   at least one processor; and
   at least one memory including computer program code,
   wherein the at least one memory and the computer program code are configured to, with the at least one processor, cause the apparatus at least to
   extract electric network frequency signals from a video recording or an audio recording; and
   synchronize the video recording or the audio recording with at least one other datum based on the electric network frequency signals, wherein the at least one memory and the computer program code are configured to, with the at least one processor, cause the apparatus at least to take a sample as a mean value for each row or column of an image frame of the video recording.

5. An apparatus, comprising:
   at least one processor; and
   at least one memory including computer program code,
   wherein the at least one memory and the computer program code are configured to, with the at least one processor, cause the apparatus at least to
   extract electric network frequency signals from a video recording or an audio recording; and
   synchronize the video recording or the audio recording with at least one other datum based on the electric network frequency signals, wherein the at least one memory and the computer program code are configured to, with the at least one processor, cause the apparatus at least to extract electric network frequency signals from frames containing scenes of at least one moving object.

6. The apparatus of claim 5, wherein the at least one memory and the computer program code are configured to, with the at least one processor, cause the apparatus at least to limit extraction to at least one static region of the video recording.

\* \* \* \* \*